S. W. SMITH.
HEAD GATE.
APPLICATION FILED MAR. 16, 1918.
1,270,228.
Patented June 18, 1918.
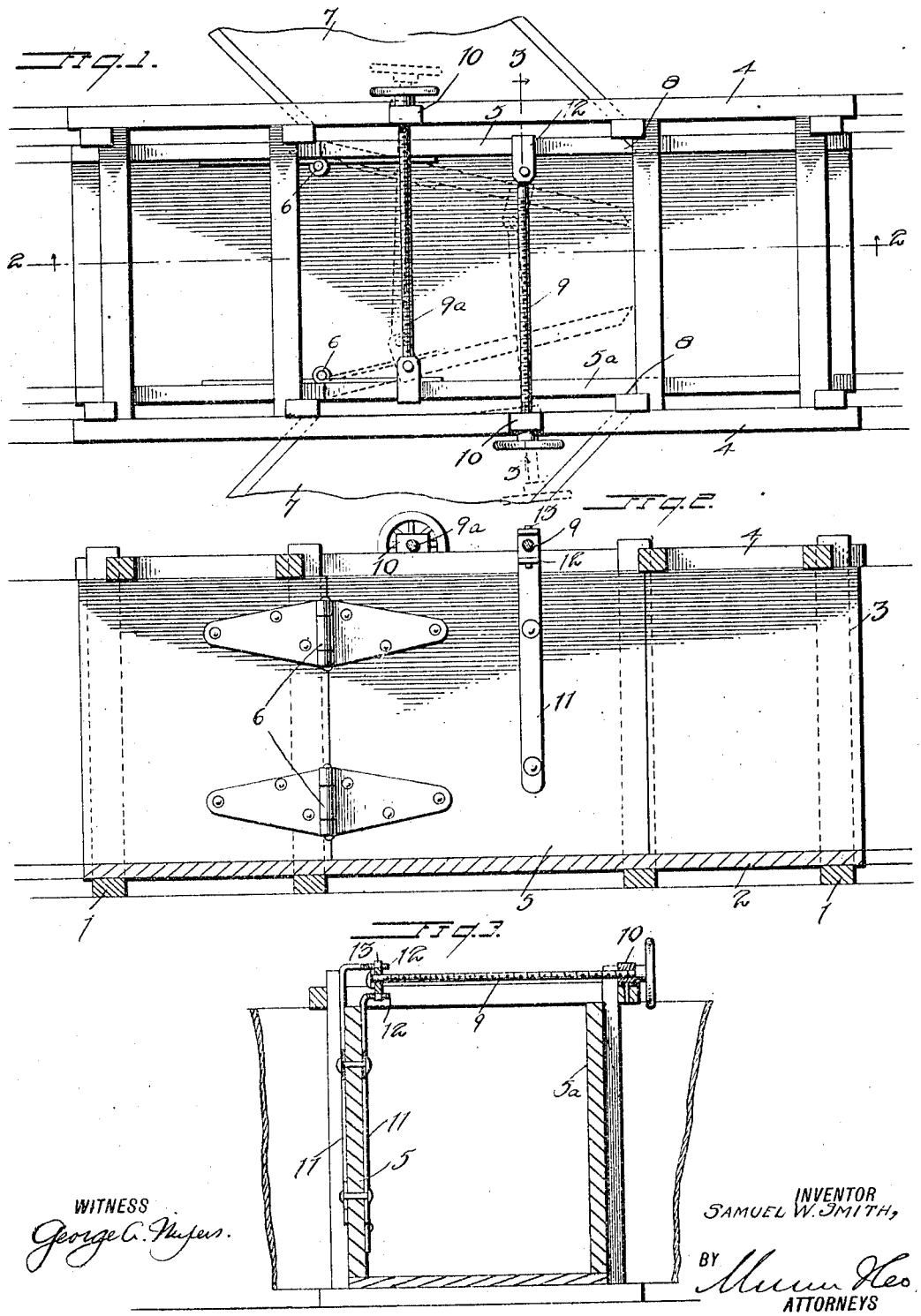
WITNESS
George C. Myers.
INVENTOR
SAMUEL W. SMITH,
BY
ATTORNEYS

UNITED STATES PATENT OFFICE.

SAMUEL WASHINGTON SMITH, OF CEDARVILLE, CALIFORNIA.

HEAD-GATE.

1,270,228.  Specification of Letters Patent.  Patented June 18, 1918.

Application filed March 16, 1918. Serial No. 222,905.

*To all whom it may concern:*

Be it known that I, SAMUEL WASHINGTON SMITH, a citizen of the United States, and a resident of Cedarville, in the county of Modoc and State of California, have invented certain new and useful Improvements in Head-Gates, of which the following is a specification.

My invention is an improvement in head gates, and has for its object to provide a device of the character specified for use in irrigating ditches, so arranged that a predetermined amount of water may be cut out from the ditch into a lateral and so arranged that the water flowing through the ditch may be divided into three parts, if desired.

In the drawings:

Figure 1 is a top plan view of the improved gate;

Figs. 2 and 3 are sections on the line 2—2 and 3—3, respectively, of Fig. 1, each view looking in the direction of the arrows adjacent the line.

In the present embodiment of the invention, the gate comprises a trough shaped frame composed of substantially rectangular frames 1, arranged at spaced intervals and connected by a solid bottom 2 and solid side walls 3. Brace beams 4 are connected with the tops of the frames at opposite sides of the troughs, and each side wall has an opening normally closed by gates 5 and 5ᵃ.

These gates are hinged at 6 at the downstream side of the gate, and at each gate is a lateral 7. Each gate has its free edge beveled as shown at 8, and that portion of the side wall against which the gate closes at the said edge is also beveled as shown. The gates are opened and closed by screw threaded rods 9 and 9ᵃ, respectively, each of which is held at one end in a nut 10 on the adjacent beam 4, and is provided at the said end with a hand wheel, as shown. At the opposite end each rod has a connection with the gate.

The nuts 10 are mounted to swing on the beams as shown, to follow the movement of the rod as the gate opens and closes, and each rod is connected to the gate by means of a pair of straps 11 which are arranged on opposite sides of the gate and secured thereto as shown more particularly in Fig. 3.

These straps extend above the gate, and each strap is bent at an angle, as shown at 12, toward the rod, to provide a support for a swinging plate 13. This plate has journal pins at its ends which engage openings in angular portions 12 of the straps and the rod is journaled in the plate 13, each rod having a head at the opposite side of the plate from the wheel. It will be evident that by turning the rods in the proper direction by means of the hand wheels the gates may be opened, as indicated by dotted lines in Fig. 1, to any desired degree. Thus the water in the ditch may be divided into three portions, one portion passing along the ditch and the other portions passing out the laterals.

I claim:

1. A device of the character specified, comprising in combination with the trough having lateral openings, of gates for closing the openings and hinged to the trough at the downstream side of the openings, and independent means for opening and closing each gate and for holding it in adjusted position, said means comprising screw threaded rods, each rod being pivoted to the gate at one end, a nut pivoted to the trough at the opposite side from the gate through which the rod passes, each rod having a hand wheel at the end remote from the gate.

2. A device of the character specified, comprising in combination with the trough having lateral openings, of gates for closing the openings and hinged to the trough at the downstream side of the openings, and independent means for opening and closing each gate and for holding it in adjusted position, said means comprising a threaded rod for each gate and connected to the gate at one end, and a nut on the trough through which the rod passes.

SAMUEL WASHINGTON SMITH.

Copies of this patent may be obtained for five cents each, by addressing the "Commissioner of Patents, Washington, D. C."